I. E. MILLER.
PERCOLATOR.
APPLICATION FILED JAN. 28, 1914.
1,167,775.
Patented Jan. 11, 1916.
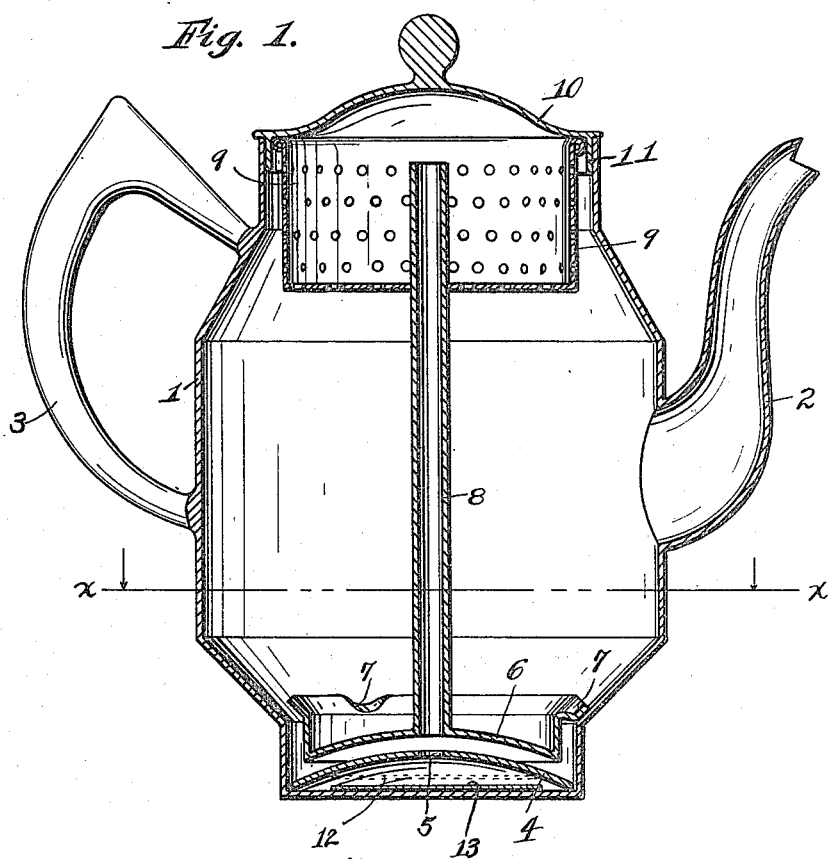
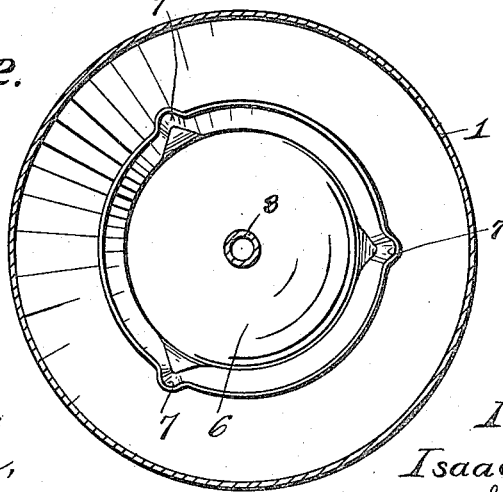
Witnesses:
T. Coleon,
A. A. Olson.
Inventor:
Isaac E. Miller,
By Joshua H. Pons
his Attorney.
COLUMBIA PLANOGRAPH CO., WASHINGTON, D. C.

UNITED STATES PATENT OFFICE.

ISAAC E. MILLER, OF CHICAGO, ILLINOIS.

PERCOLATOR.

1,167,775. Specification of Letters Patent. Patented Jan. 11, 1916.

Application filed January 28, 1914. Serial No. 814,900.

*To all whom it may concern:*

Be it known that I, ISAAC E. MILLER, a citizen of the United States, and a resident of the city of Chicago, county of Cook, and State of Illinois, have invented certain new and useful Improvements in Percolators, of which the following is a specification.

My invention relates to improvements in coffee percolators and has for its object the production of a device of this character which will be of improved construction and efficient in operation.

Other objects will appear hereinafter.

The invention consists in the combinations and arrangements of parts hereinafter described and claimed.

The invention will be best understood by reference to the accompanying drawing forming a part of this specification, and in which—

Figure 1 is a central vertical section of a percolator embodying my invention, and Fig. 2 is a horizontal section taken on line *x—x* of Fig. 1.

The preferred form of construction as illustrated in the drawing comprises a receptacle 1 preferably of the design shown, said receptacle being equipped with a pouring spout 2 and a handle 3, the upper end thereof being open.

Arranged in the receptacle 1 upon the bottom thereof is a false bottom 4, the latter being concavo-convex in form with the convex side thereof uppermost, so that the periphery of said member 4 rests upon the receptacle bottom and the central portion thereof is spaced therefrom. Provided centrally in the false bottom 4 is an opening 5. Arranged above the false bottom 4 is a cup member 6 the bottom thereof being spaced from said false bottom and disposed concentric therewith so as to form a passage extending from the opening 5 toward the periphery of member 4. The lateral wall of cup member 6 is of a diameter less than the corresponding portion of the lateral wall of the receptacle 1 so that an annular passage is formed leading upwardly from the passage above referred to and communicating with the interior of the receptacle. The cup member 6 is supported in the position shown by depressions or offset portions 7 which rest upon the adjacent shoulder formed in the lateral wall of the receptacle 1.

Extending upwardly from the cup 6 in axial alinement with opening 5 is a pipe 8 supporting at its upper end a foraminated container 9 which is adapted, when the device is in use, to contain the coffee grounds. The container 9 is open at its upper side, the lid or cover 10 of the receptacle 1 when in position serving the double function of closing the receptacle as well as the upper end of said container. An annular depending flange 11 of said lid which fits within the upper end of said receptacle also fits snugly around the upper end of container 9 to hold the same snugly and securely in position.

The arrangement of the false bottom 4 upon the bottom of the receptacle 1 results in the formation of a chamber 12 intermediate said false bottom and said receptacle bottom. Arranged in said chamber is a vibratory plate or disk 13, said plate, during the operation of the device, being free to vibrate vertically as shown by the dotted lines in Fig. 1.

In the operation of the device water is first introduced into the receptacle 1, the quantity depending of course upon the amount of coffee which it is desired to boil. The coffee grounds are then placed in container 10 whereupon the latter, together with pipe 8 to which said container is fixed, and the cup 6 carrying said pipe, are inserted into the receptacle to the position shown. Upon applying heat to the bottom of receptacle 1, the water in said receptacle will be heated to the boiling point. The zone of greatest heat will of course be at the bottom of the receptacle or within the chamber 12. When the water is heated to the boiling point the boiling action will result in a vibratory movement being imparted to the member 13 which results in a pumping action in chamber 12. This pumping action results in the water being forced up into the pipe 8, the water thus forced up into said pipe passing from the upper end thereof into container 10 where the same percolates through the coffee grounds with the result desired as will be readily understood. The vibratory action of plate 13, as just mentioned results from a thin film of water being imprisoned thereunder, which film, because of the intense heat applied to the bottom of the receptacle, is vaporized or gasified rapidly, the expansion resulting from such vaporization or conversion into steam forcing said member 13 upwardly to the dotted line position shown in Fig. 1. As said member again descends, another film of water will be imprisoned thereunder, with the same result as just mentioned. Thus during the application of heat to the bottom of the receptacle, said plate will be caused to continually vibrate, resulting in the desired pumping action as above described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the kind described comprising a receptacle; a foraminated container arranged in the upper end of said receptacle; a chamber in said receptacle immediately above the bottom thereof in open communication with the interior of said receptacle; a vibratory member arranged in said chamber normally resting in close proximity with the bottom of said receptacle, the upper wall of said chamber having an opening through which the liquid in said chamber will be forced upon vibration of said member; and a pipe arranged in said receptacle communicating at its upper end with said container, the lower end of said pipe being so positioned that liquid forced from said chamber through the opening in the upper wall thereof by vibration of said member, will enter said lower end of said pipe, substantially as described.

2. A device of the kind described comprising a receptacle; a foraminated container arranged in the upper end of said receptacle; a chamber in said receptacle immediately above the bottom thereof in open communication with the interior of said receptacle; a vertically vibratory member arranged in said chamber normally resting in close proximity with the bottom of said receptacle, the upper wall of said chamber having an opening through which the liquid in said chamber will be forced upon vibration of said member; and a vertically extending pipe arranged in said receptacle communicating at its upper end with said container, the lower end of said pipe being so positioned that the liquid forced from said chamber through the opening in the upper wall thereof by vibration of said member, will enter said lower end of said pipe, substantially as described.

3. A device of the kind described comprising a receptacle; a foraminated container arranged in the upper end of said receptacle; a chamber in said receptacle immediately above the bottom thereof, the upper wall of said chamber having a central opening; a passage leading outwardly from said opening establishing communication between the same and the interior of said receptacle; a vibratory member arranged in said chamber normally resting in close proximity with the bottom of said receptacle; vibration of said member causing the liquid in said chamber to be forced therefrom through said openings; and a vertically extending pipe arranged in said receptacle communicating at its upper end with said container, the lower end of said pipe being so positioned that the liquid forced from said chamber through the opening in the upper wall thereof by vibration of said member, will enter said lower end of said pipe, substantially as described.

4. A device of the class described comprising a receptacle; a foraminated container arranged in the upper end of said receptacle; a vertically extending pipe arranged substantially centrally in said receptacle and communicating at its upper end with said container; a false bottom arranged upon the bottom of said receptacle having its central portion spaced from said bottom, said false bottom having an opening therein in alinement with said pipe; a vertically movable member arranged below said false bottom; and means arranged above said false bottom forming a passage establishing communication between the opening therein and the interior of said receptacle, said passage extending outwardly along said false bottom and then upwardly opening into said receptacle interior, substantially as described.

5. A device of the class described comprising a receptacle; a foraminated container arranged in the upper end of said receptacle; a vertically extending pipe arranged substantially centrally in said receptacle and communicating at its upper end with said container; a false bottom arranged upon the bottom of said receptacle having its central portion spaced from said bottom, said false bottom having an opening therein in alinement with said pipe; a vertically movable disk loosely arranged below said false bottom; means arranged above said false bottom forming a passage establishing communication between the opening therein and the interior of said receptacle, said means comprising a member spaced from and extending substantially parallel with said false bottom; and an annular flange arising from the periphery of said member spaced from and disposed concentric with the lateral wall of said receptacle, substantially as described.

6. A device of the class described comprising a receptacle; a foraminated container arranged in the upper end of said receptacle; a vertically extending pipe arranged substantially centrally in said receptacle and having its upper end communicating with and supporting said container; a false bottom arranged upon the bottom of said receptacle having its central portion spaced from said bottom, said false bottom having an opening therein in alinement with said pipe; a vertically movable disk loosely arranged below said false bottom; and a cup member supported above said false bottom, the lower end of said pipe passing through the bottom of said cup member and being supported thereby, the lateral wall of said cup member being spaced from the lateral wall of said receptacle, substantially as described.

7. A device of the class described comprising a receptacle; a foraminated container arranged in the upper end of said receptacle; a vertically extending pipe arranged substantially centrally in said receptacle and having its upper end communicating with and supporting said container; a concavo-convex false bottom arranged upon the bottom of said receptacle with its convex side uppermost so that the periphery of said member rests upon said receptacle body and the central portion thereof is spaced therefrom, said false bottom having an opening in the central portion thereof in alinement with the lower end of said pipe; a disk arranged for free vertical movement below said false bottom; and means arranged above said false bottom having a passage establishing communication between the opening therein and the interior of said receptacle, said passage extending outwardly along said false bottom and then upwardly opening into said receptacle interior, substantially as described.

8. A device of the class described comprising a receptacle; a foraminated container arranged in the upper end of said receptacle; a vertically extending pipe arranged substantially centrally in said receptacle and having its upper end communicating with and supporting said container; a concavo-convex false bottom arranged upon the bottom of said receptacle with its convex side uppermost so that the periphery of said member rests upon said receptacle body and the central portion thereof is spaced therefrom, said false bottom having an opening in the central portion thereof in alinement with the lower end of said pipe; a disk arranged below said false bottom for free vertical movement; and a cup member supported above said false bottom and having its bottom spaced from said false bottom, the lower end of said pipe passing through the bottom of said cup member and being supported thereby, the lateral wall of said cup member being spaced from the lateral wall of said receptacle, substantially as described.

In testimony whereof I have signed my name to this specification in the presence of two subscribing witnesses.

ISAAC E. MILLER.

Witnesses:
 JOSHUA R. H. POTTS,
 HELEN F. LILLIS.

Copies of this patent may be obtained for five cents each, by addressing the "Commissioner of Patents, Washington, D. C."